United States Patent [19]
Wilkins et al.

[11] Patent Number: 6,053,532
[45] Date of Patent: Apr. 25, 2000

[54] MULTI-POINT PRETENSIONER SYSTEM

[75] Inventors: Michael D. Wilkins, Roseville; Edward W. Clancy, III, Livonia; Douglas L. Forsyth, Sterling Heights, all of Mich.

[73] Assignee: Breed Automotive Technology, Inc., Lakeland, Fla.

[21] Appl. No.: 09/170,410

[22] Filed: Oct. 13, 1998

[51] Int. Cl.[7] ................................................ B60R 22/46
[52] U.S. Cl. ......................... 280/806; 297/480; 242/374
[58] Field of Search ............................ 280/806, 801.1; 297/480; 242/388.6, 374; 180/268

[56] References Cited

U.S. PATENT DOCUMENTS

| | | | |
|---|---|---|---|
| 3,241,883 | 3/1966 | Fontaine . | |
| 3,488,090 | 1/1970 | Douglas | 280/806 |
| 3,606,378 | 9/1971 | Prostan | 280/806 |
| 3,907,059 | 9/1975 | Takada et al. . | |
| 3,963,273 | 6/1976 | Nagazumi | 280/806 |
| 4,015,860 | 4/1977 | Tisell et al. | 297/480 |
| 4,372,580 | 2/1983 | Motonami et al. | 280/802 |
| 4,767,161 | 8/1988 | Sedlmayr et al. | 297/472 |
| 4,823,905 | 4/1989 | Piech | 180/274 |
| 5,301,772 | 4/1994 | Honda | 180/268 |

Primary Examiner—Paul N. Dickson
Attorney, Agent, or Firm—Markell Seitzman

[57] ABSTRACT

A system for eliminating residual seat belt slack about a plurality of occupants of a vehicle, the system comprising a plurality of seat belt assemblies securable about a respective occupant, each seat belt assembly including a lap belt portion, a tongue, and a buckle, one end of the lap belt secured to a support member and an opposite end of the lap belt operatively joined to the tongue, the buckle matingly locking with the tongue, the buckle secured to one end of a connecting member, the connecting member having an opposite second end; a belt tightener is secured to the second end of each connecting member, for generally simultaneously tightening each seat belt assembly about a respective occupant.

9 Claims, 11 Drawing Sheets

MULTI-POINT PRETENSIONER SYSTEM

BACKGROUND AND SUMMARY OF THE INVENTION

The invention generally relates to automotive safety restraint systems and more particularly to a pretensioning system capable of simultaneously removing the slack in a plurality of seat belts, secured about respective occupants, utilizing a single pretensioning or belt-tightening device.

Pretensioners or belt tighteners, as they are also known in the art, are used to tighten a portion of a seat belt system, thereby removing slack about the occupant, during an accident. This action is done prior to the time the occupant begins to move forward as a result of the deceleration of the vehicle.

As a typical accident progresses, the occupant will remain fixed to the seat and begin to move forward at about 20 milliseconds after the initiation of the crash. Belt tighteners must react and eliminate the slack in the seat belt system, about the occupant, prior to the occupant's moving forward. Typically the pretensioning system is designed to react quickly and eliminate the slack in about 10 milliseconds upon receipt of a control signal, which is generated by one or more crash sensors and associated electronic control systems. There exists in the art two basic types of seat belt pretensioning systems. The first is associated with the spool of a retractor and the shoulder belt of a three-point seat belt system. During the accident the spool is caused, by various means, to reverse-wind or retract thereby removing the slack, typically in the shoulder belt portion of the seat belt system, to thereby hold the occupant in place. The other type of pretensioning system is called a buckle pretensioner. The buckle pretensioner is typically connected by a length of seat belt webbing or by a cable to the seat belt buckle. These buckle pretensioning systems (as well as retractor systems) include a pyrotechnic element which is fired, causing the buckle to be pulled downwardly, thereby reducing slack about the occupant. The prior art generally shows one pyrotechnic element associated with each shoulder belt (for the retractor pretensioner) or with each buckle (for a buckle pretensioner).

It is an object of the present invention to provide a single pretensioning device that is capable of eliminating the slack in a plurality of seat belt systems.

Accordingly the invention comprises a system for eliminating residual seat belt slack about a plurality of occupants of a vehicle, the system comprising: a plurality of seat belt assemblies securable about each respective occupant, each seat belt assembly including a lap belt, a tongue, and a buckle. One end of the lap belt is secured to a support member and an opposite end of the lap belt is operatively joined to the tongue. The buckle matingly locks with the tongue and the buckle is secured to one end of a connecting member, the connecting member having an opposite second end. A belt tightening means, secured to the second ends of each connecting member, generally simultaneously tightens each seat belt assembly about a respective occupant. Each belt assembly may also include a shoulder belt.

Many other objects and purposes of the invention will be clear from the following detailed description of the drawings.

DETAILED DESCRIPTION OF THE DRAWINGS

Figure 1:
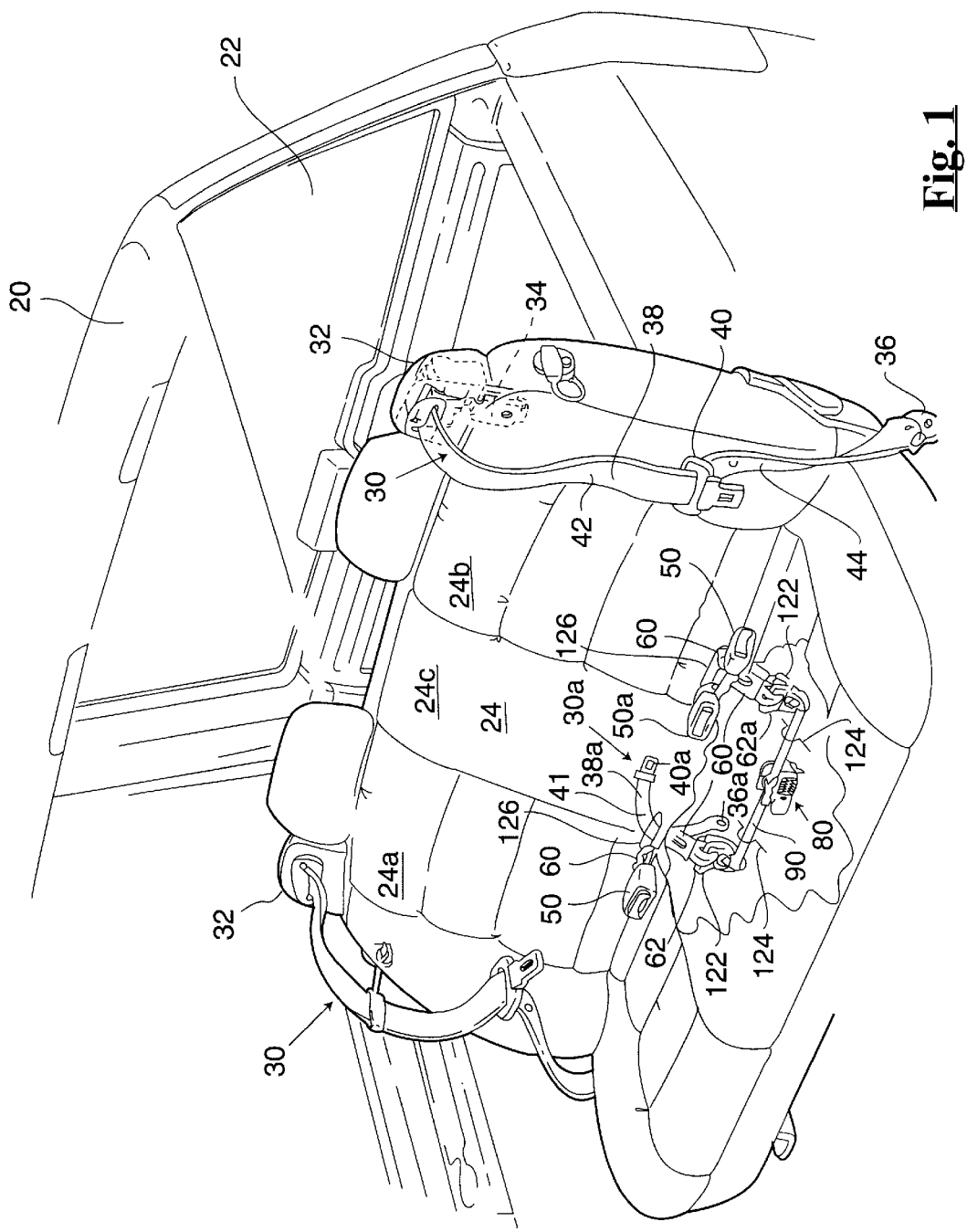
FIG. 1 shows a front view of the rear seat in a vehicle passenger compartment.

Reference is made to FIG. 1 which illustrates an isometric view of a typical rear portion of the passenger compartment of a vehicle 20. Situated in the passenger compartment 22 is a rear bench seat 24 that is sufficiently wide to enable three occupants (not illustrated) to be seated thereon. The vehicle seat 24 is relatively conventional. Situated on the outboard sections 24a and 24b of the seat 24 are respective three-point seat belt systems 30. These seat belt systems include a retractor 32 of known variety connected by a bracket 34 to a frame component of the seat. Each system 30 further includes an anchor 36 and a length of seat belt (seat belt webbing) 38. A tongue 40 is slidably received on the seat belt 38 and divides the seat belt into a shoulder belt portion (shoulder belt) 42 and a lap belt portion (lap belt) 44. The tongue 40, as is known in the art, is designed to lock within a mating buckle 50. During normal operation, the tongue 40 is received within seat belt 50 and tongue 40a received within seat belt 50a. As can be seen from FIG. 1, both of the seat belt systems 30 are virtually identical. The retractor 32 can be an emergency locking retractor (ELR) which permits the free protraction and retraction of the seat belt until there is an emergency, upon which various web and vehicle sensors lock the retractor, preventing further protraction. This type of retractor is well known in the art. Alternatively, the retractor might be the ELR/ALR retractor which, as is known in the art, is an emergency locking retractor having a mode-switching mechanism which causes the retractor to switch to an automatically locking retractor after a predetermined amount of shoulder belt 42 has been extracted from the retractor.

The center passenger may be protected by a different type of seat belt system. As illustrated the center passenger is protected by a two-point system 30a. The center passenger would be seated generally in the center section 24c of seat 24. The seat belt system 30a to protect the center passenger comprises a length of seat belt webbing 38a having a tongue 40a which is secured to a buckle 50a. One end, such as 41 of the seat belt 38a, is secured via an anchor 36a to a structural component or frame of the vehicle or seat.

As can be seen from FIG. 1, the buckles 50 and 50a are each secured to a flexible connecting member which can be a length of seat belt webbing or a thin flexible cable. In the prior art these connecting members would either be fixedly anchored to the vehicle floor or seat frame or attached to separate pretensioning devices. In the case of the buckle 50 for a passenger seated within section 24a of seat 24, an end of the connecting member 60 is formed into a loop 62. With regard to the buckle associated with the passenger seated in section 24b of the seat and with regard to buckle 50a, the ends of the associated connecting members (lengths of seat belt webbing) 60 are connected and formed into a common loop (or overlapping loops) 62a. The loops can be formed by other material attached to ends of the connecting members 60.

Figure 2:
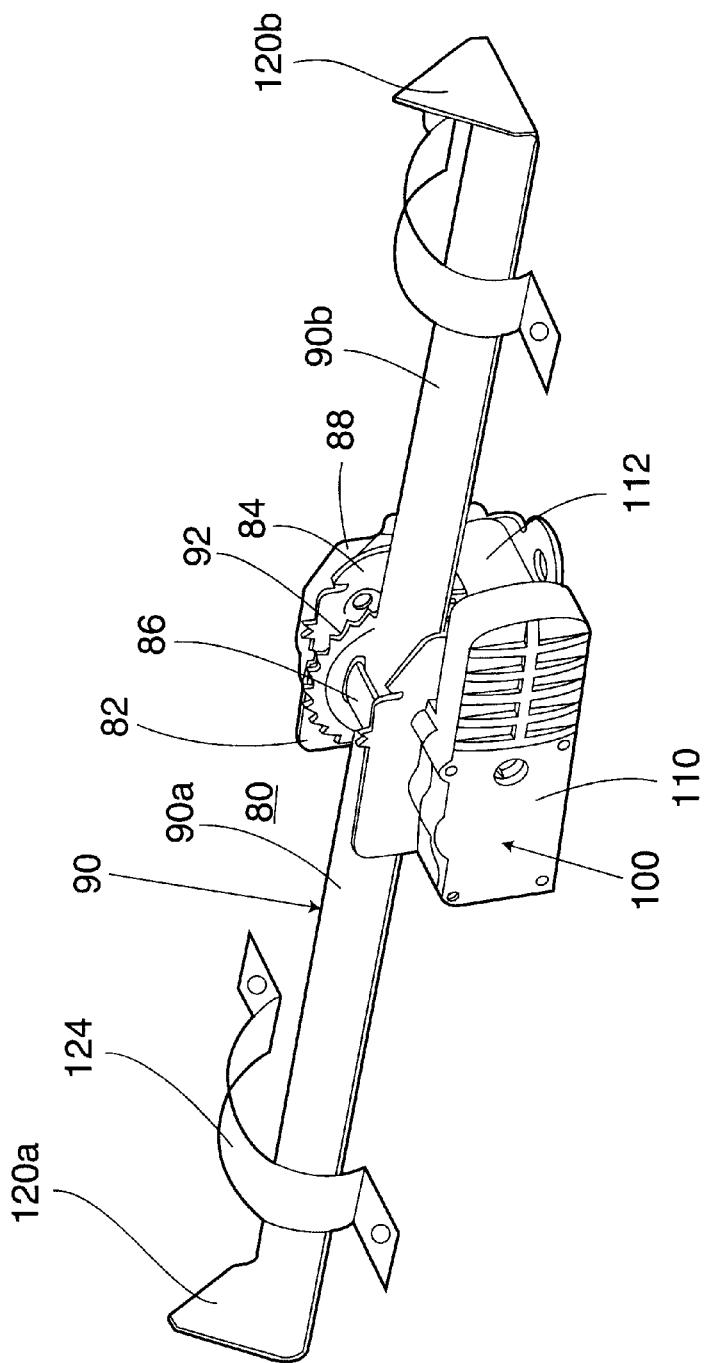
FIG. 2 illustrates a pretensioning device useful with the seat belt systems shown in FIG. 1.
Figure 3:
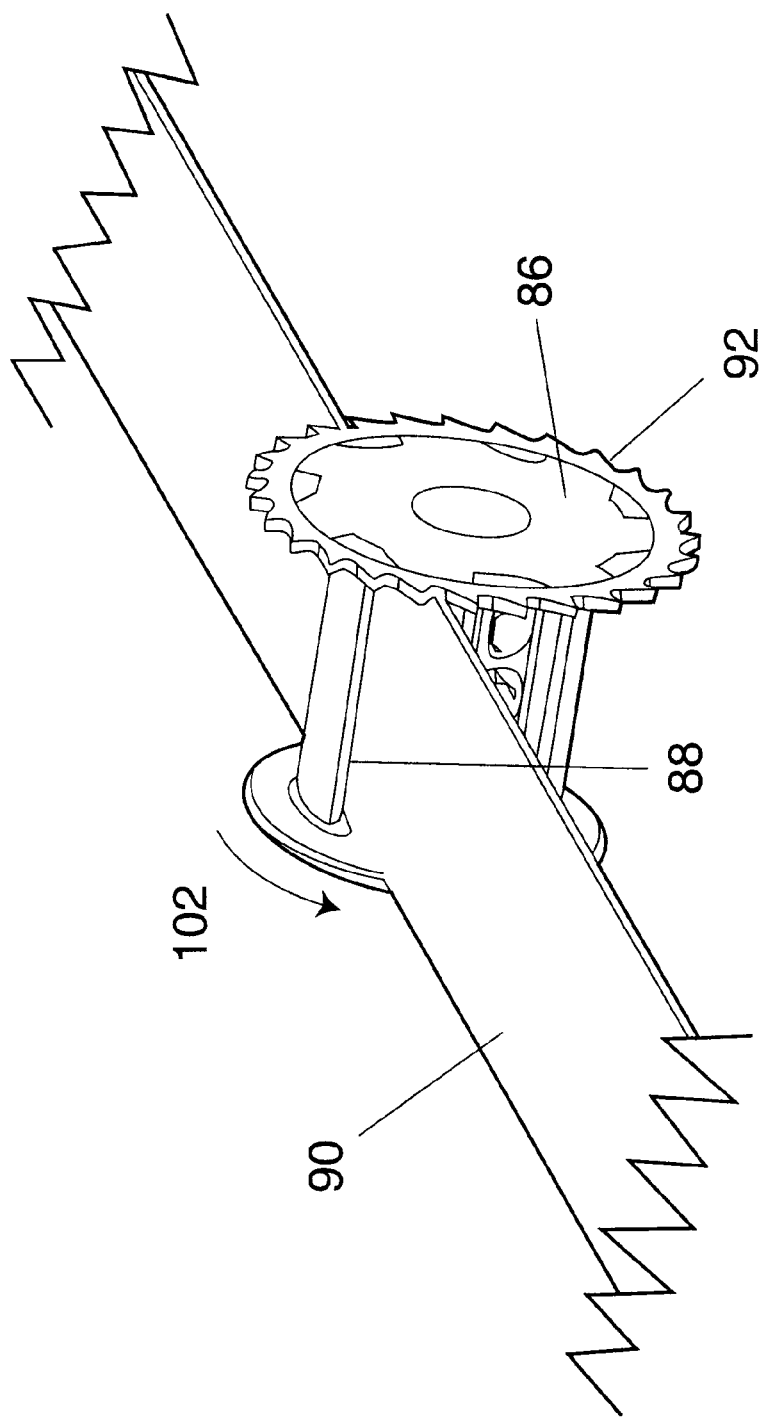
FIG. 3 illustrates a spool which is part of the pretensioning device shown in FIG. 2.

Reference is now made to FIG. 2 which illustrates a pretensioning mechanism 80 which is used to simultaneously pull the two buckles 50 and the single buckle 50a downwardly to eliminate the slack in the belt systems secured about respective outboard passengers as well as the middle passenger. As illustrated in FIG. 2, the pretensioner 80 includes many of the components of a conventional seat belt retractor (rotary) pretensioner. More particularly, the pretensioning device 80 comprises a seat belt retractor 82 comprising a frame 84. Rotationally supported on the frame 84 is a spool 86. As illustrated in FIG. 3, the spool 86 includes a slot 88 through which another length of flexible seat belt material (a tightening member) 90 is threaded therethrough. The seat belt can simply be threaded through the slot or the webbing can be fixedly secured to the spool. In the preferred embodiment of the invention, the retractor 80 will include a vehicle sensor which is oriented to respond to the deceleration vector of the vehicle and which, when activated, brings a locking pawl (not shown) into engagement with lock teeth 92 to prevent the spool 86 from further rotating. This construction of the locking pawl and lock teeth 92 is well known in the art. The pretensioning device 80 includes a pretensioner 100 which, when activated, causes the spool to rotate in a direction shown by arrow 102. In the present invention, any of the rather large variety of retractor (rotary) pretensioning mechanisms can be used. As illustrated in FIG. 2, the pretensioner 100 includes an elongated body 110. Situated within the left-hand portion of the body is a quantity of pyrotechnic material generally shown as 112. The spool 86 may include an extending shaft which extends into the body 110. A circular, toothed spur gear is secured to the shaft of the spool. Upon sensing the occurrence of an accident by one or more crash sensors, a control signal is generated by a control unit which activates the pyrotechnic material 112, producing products of combustion. These products of combustion force the rack to the right within body 110, thereby causing the spur gear, secured to the spool, to rotate. As the spool rotates, the respective sides of connecting member 90 (including portions 90a and 90b) situated on either side of the pretensioning device, are caused to be wound about the spool. Further, as the spool rotates, the lock teeth 92 associated with the spool ratchet upon a lock pawl, which has been brought by operation of the vehicle sensor into locking engagement with the teeth. Thereafter, the locking pawl moves into locking contact with the teeth 92, thereby preventing the sections 90a and 90b from protracting from the spool, thereby preventing the buckles from moving outwardly as the lap belt is loaded by the occupant during the accident. As can be seen from FIGS. 1 and 2, the ends 120a and 120b of the tightening member (seat belt section) 90 are each secured to looped fastening devices 122 which are respectively received within the webbing loops 62 and 62a.

As can be appreciated, upon activation of the single pretensioning device 80, the tightening member (webbing section) 90 is foreshortened as the seat belt 90 is wound about the spool 86. The ends 120a and 120b of member 90 pull on the respective connecting members (seat belt sections) 60 secured to each of the buckles 50 and 50a, thereby pulling the buckles downwardly into the seat, thereby reducing the slack or looseness of the seat belts about the occupants.

Upon activation of the pretensioning device, the length of the flexible member 90 is shortened as the spool rotates the sections 90a and 90b thereon, pulling the connecting members 60 downwardly. The direction of pull may be at an angle depending on the location of the buckles and the location of the pretensioning device 80. If it is desired to pull the connecting members 60 downwardly, generally perpendicular to the seating surface, the web sections 90a and 90b can be threaded through oversized rings 124 which are positioned generally below the openings 126 in the seat through which the connecting member 60 are threaded therethrough.

Figure 4:
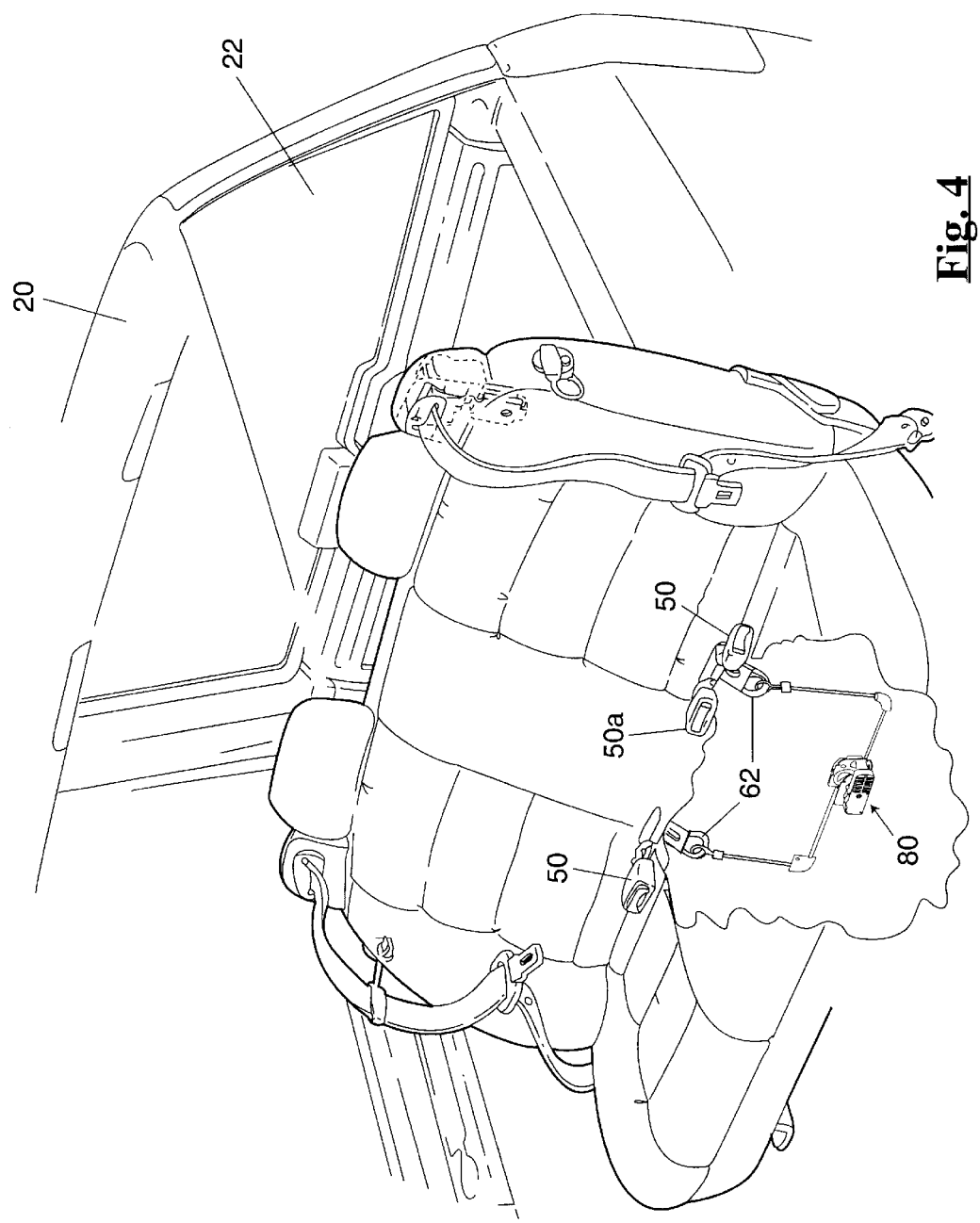
FIG. 4 illustrates an isometric view of a rear portion of the vehicle passenger compartment showing an alternate embodiment of the present invention.
Figure 5:
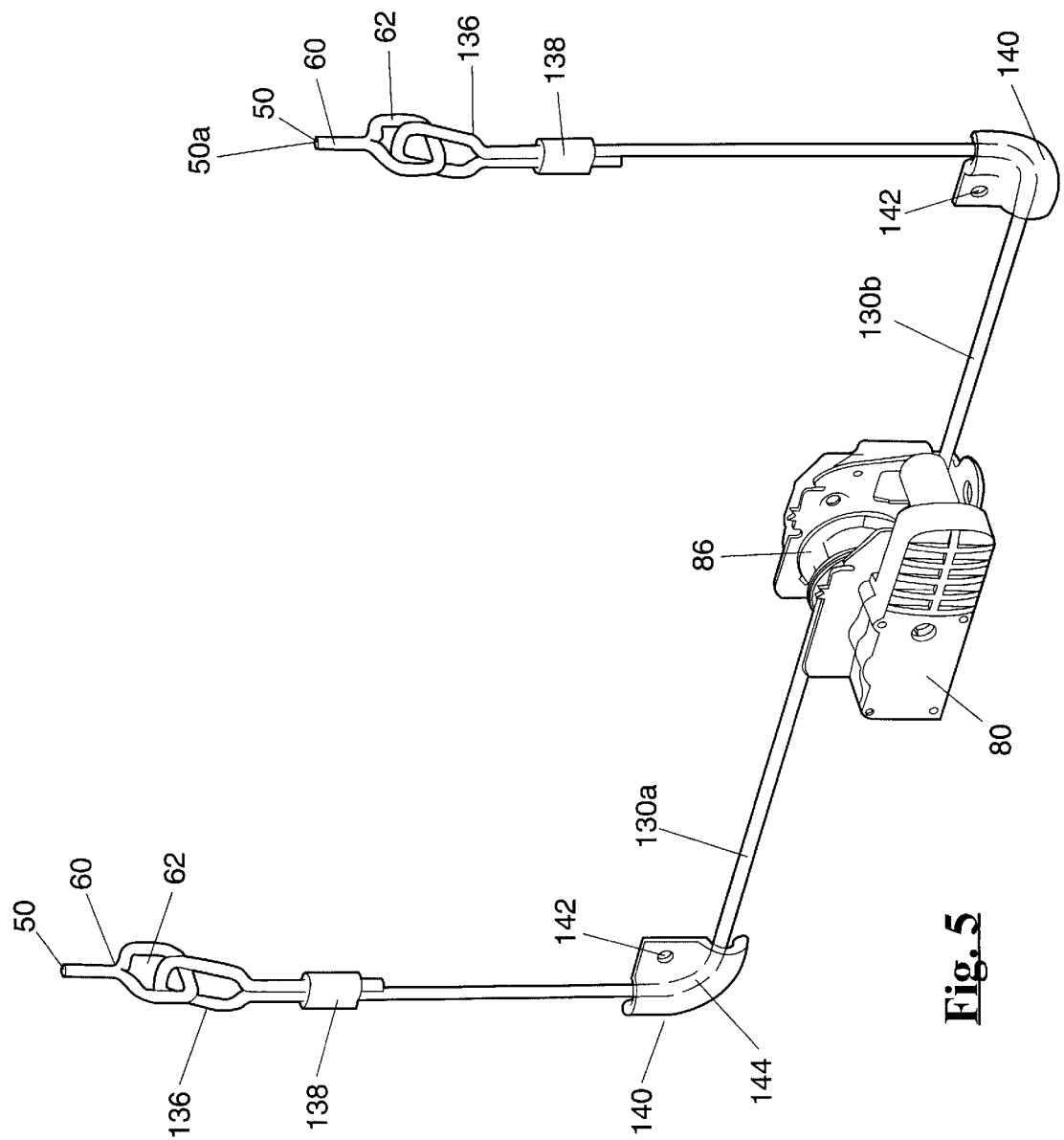
FIG. 5 shows an enlarged view of the major components of this second alternate embodiment of the invention.
Figure 6:
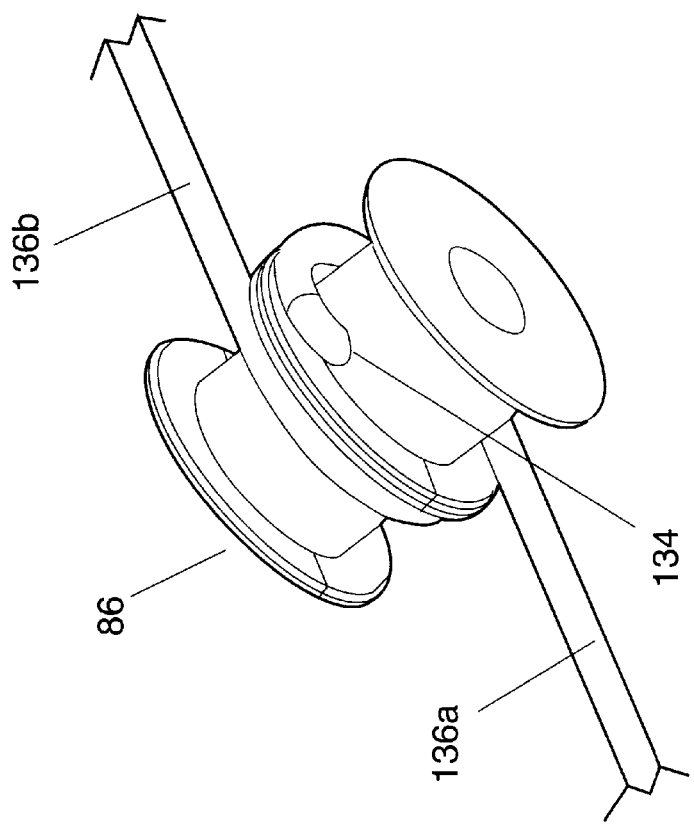
FIG. 6 illustrates an isometric view which shows the relationship between tension cables and a spool.

Reference is made to FIGS. 4–6 which illustrate another alternative embodiment of the invention. The flexible webbing 90 is replaced by two lengths or sections of cable 130a and 130b. A remote end such as 136a and 136b of each of the cable sections 130a and 130b is received within an opening 134 within the spool 86' and locked therein. Each cable section 130a and 130b is terminated in a loop 136 secured about a loop 62 of the a connecting member 60 which is connected to the appropriate buckles 50 and 50a. A cable termination 138 is used to secure a folded-over section of each cable 130a and 130b to form the respective loop 136. Each of the cables 130a and 130b is received within guide brackets 140 having a mounting hole 142. Each of the guide brackets is secured to a structural component of the vehicle or of the seat by a fastener received through the opening 142. Each of the cable brackets includes an arcuate groove 144 which is used to change the direction of the cable. The operation of this embodiment is similar to that described above. Upon activation of the pretensioning device 80, the spool 86' is caused to rotate thereby causing the cable portions 130a and 130b to be wound thereon. This action pulls the buckles 50 and 50a downwardly, thereby eliminating slack about the occupant.

Figure 7:
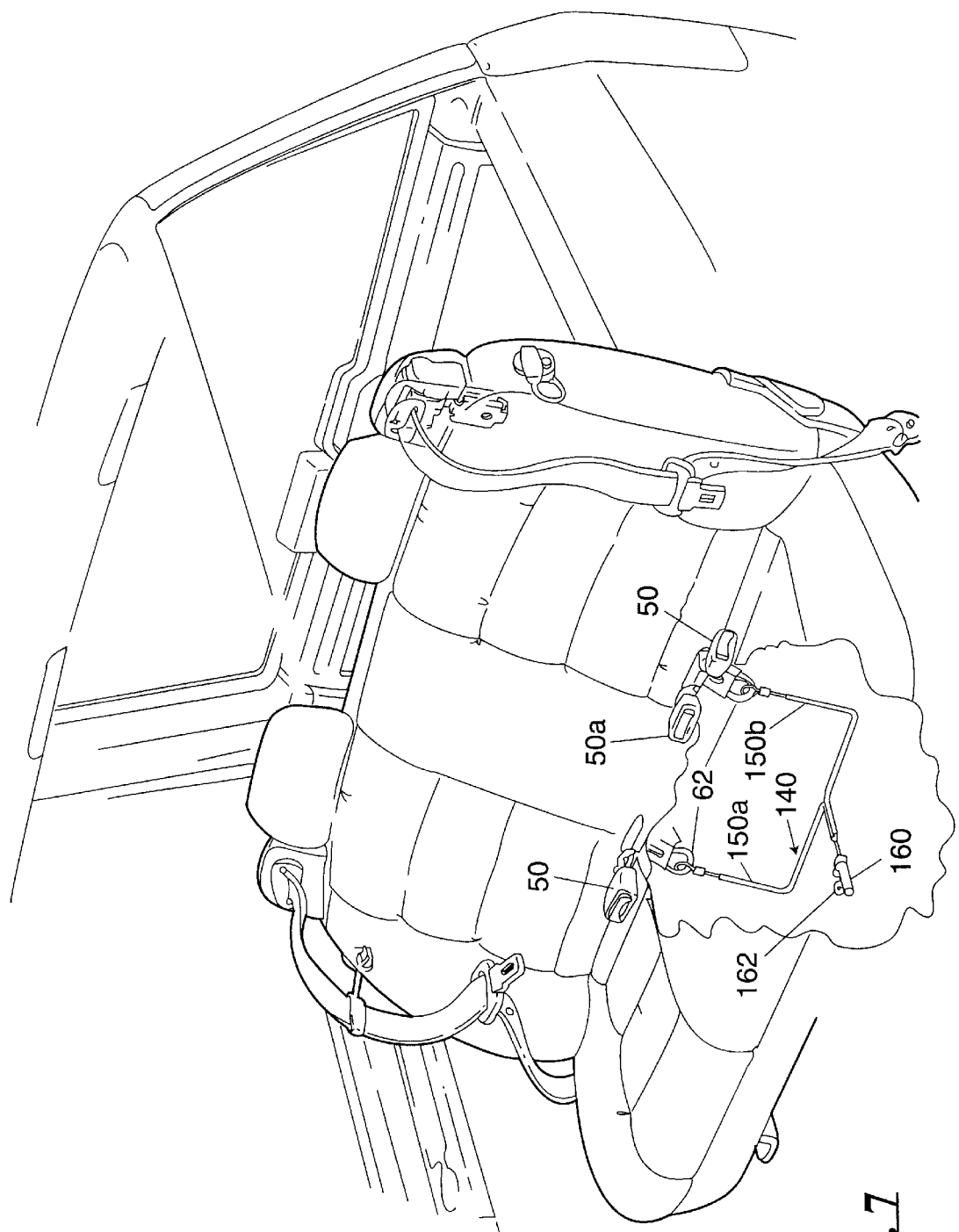
FIG. 7 illustrates a further alternate embodiment of the present invention.
Figure 8:
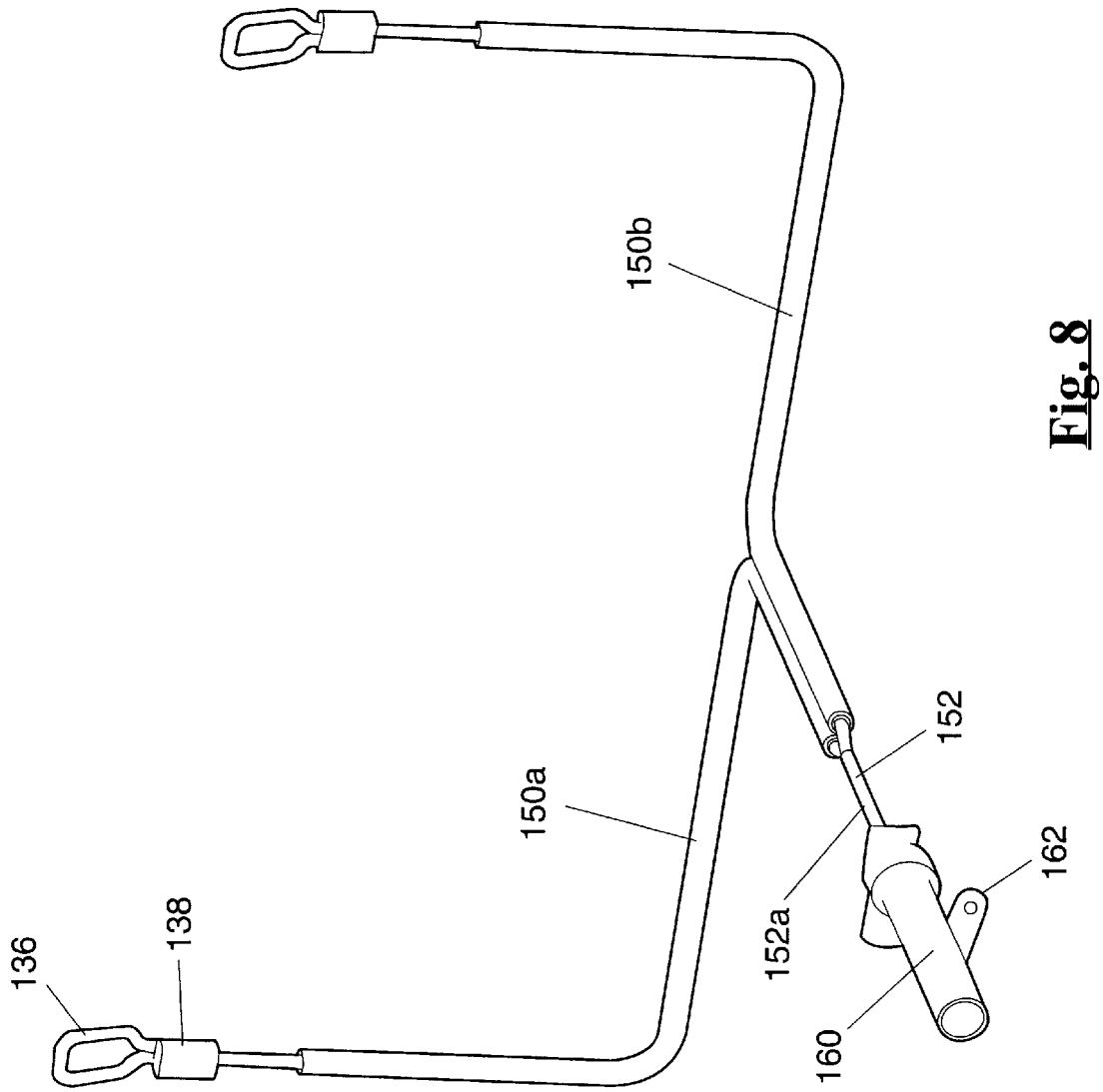
FIG. 8 illustrates an enlarged view of the major components of this third embodiment of the invention.

As can be seen from FIGS. 7 and 8, the webbing loops 62 associated with the buckles 50 and 50a are secured to a Y-shaped cable assembly 140 having legs 150a and 150b and a center portion 152. The upper ends of each of the cable legs or portions 150a and 150b are formed into loops 136 in a manner similar to that shown in FIG. 5. The loops 136 are secured to the looped ends 62 of the connecting members 60. The end 152a of the center member 152 is secured to a pretensioning device such as 80 or to a linear pretensioner 160 of known variety. The linear pretensioner includes a bracket 162 for securement to a structural member. Linear pretensioners are known in the art and include a tube having a movable piston therein. The end 152 of the cable is secured to the piston. The piston is caused to move down the tube thereby moving legs 150a and 150b in a manner to tighten the seat belts about the occupants. The tube and or the piston can include a known type of locking mechanism which operates as a one-way clutch allowing movement in a tensioning direction but not allowing the piston to be pulled in a belt loosening direction.

In some vehicles it is desirable to introduce an energy absorbing function in the seat belt system. The feature permits the seat belt to first be tightened about the occupant but, rather than locking the occupant to the seat, permits the occupant to move forward as the accident progresses. One energy absorbing mechanism modifies the locking, one-way clutch of the linear pretension by permitting it (the piston) to controllably move in a belt loosening direction (after the piston has caused the reduction of slack). This type of energy absorbing mechanism may include cutting members associated with the piston which cut or extrude material from the tube and in so doing absorbs or dissipates crash energy. This type of mechanism is well known in the art. Similarly, the energy absorbing mechanisms can be fitted to the rotary pretensioning devices. The energy absorbing mechanisms used with rotary devices such as retractors will often use a torsion bar having one end connected to a lock wheel (which includes the lock teeth), the other end of the torsion bar is connected to one end of the spool. With the lock wheel locked by action of, for example, the lock pawl, the spool and torsion bar twist (to absorb energy) as the seat belt (connected to the spool) is loaded by the occupant (during a crash).

Figure 9:
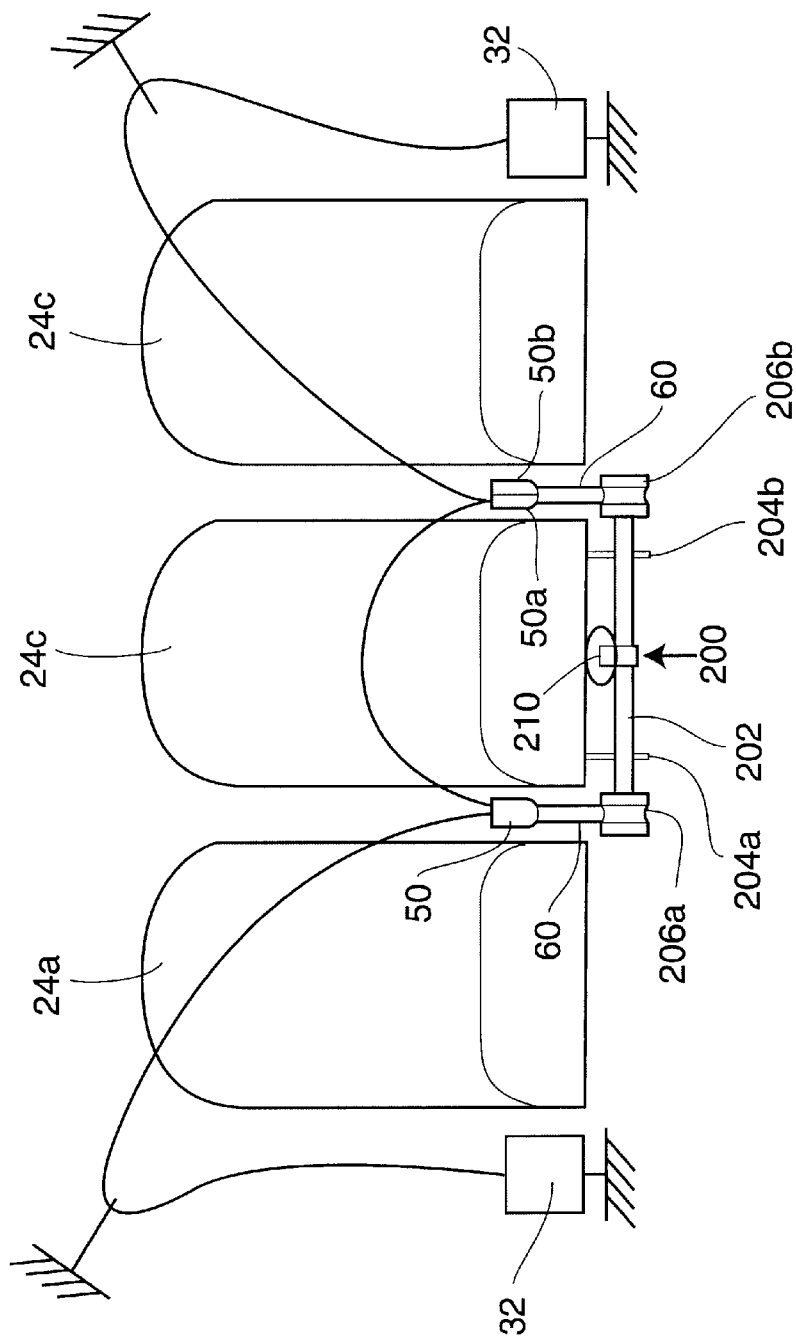
FIGS. 9 and 10 show a further embodiment of the present invention.
Figure 10:
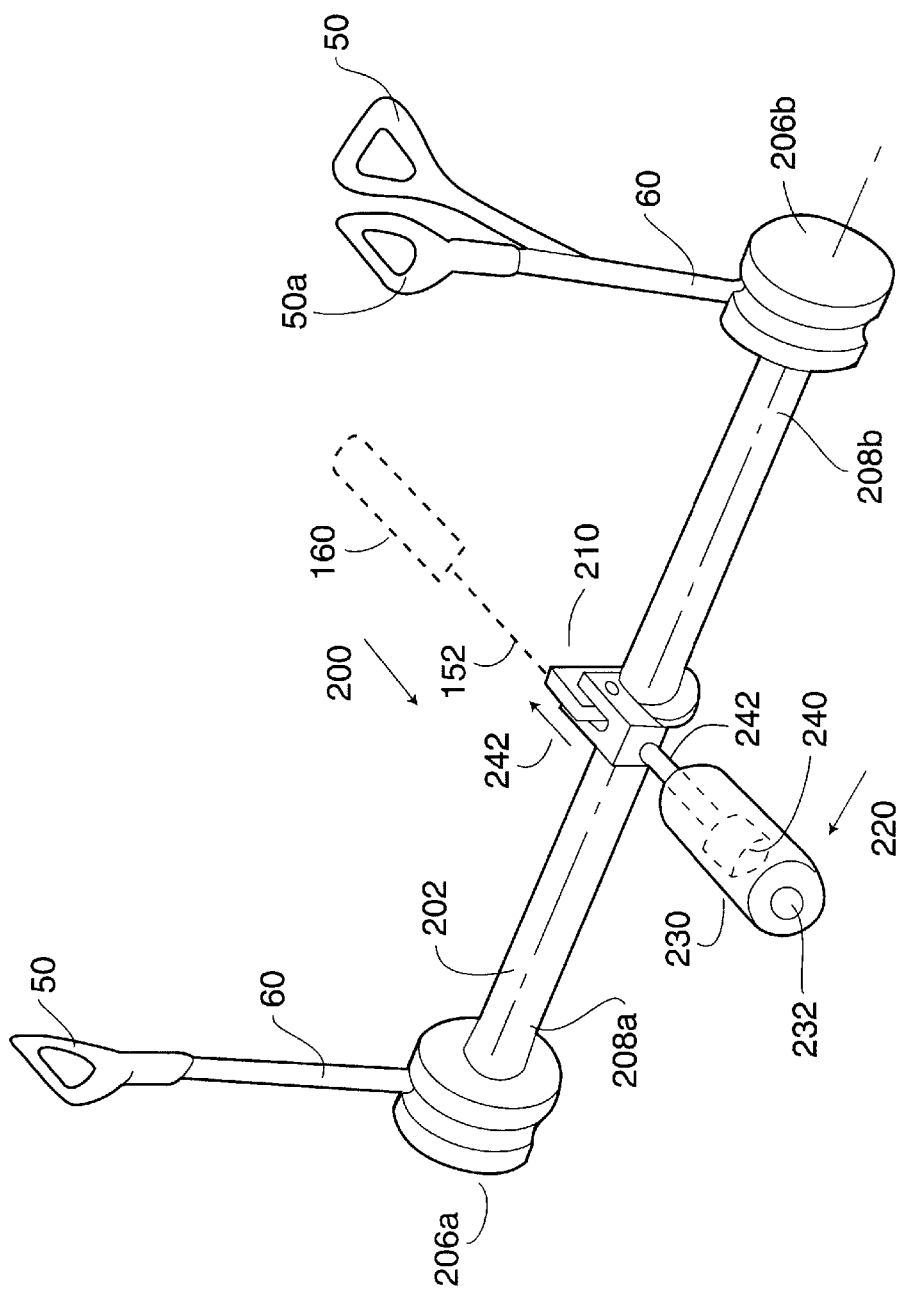

Reference is now made to FIGS. 9 and 10 which show a further embodiment of the present invention. FIG. 9 shows a seating configuration with three seating positions 24a, 24b and 24c. As can be seen, three bench seats are shown, however, the seating positions can be realized by the bench seat of FIG. 1. In FIG. 9 the seat belt retractors 32 are positioned remote from the seat and located at the lower extreme of an adjacent pillar of the vehicle such as its B or C pillar. The retractors 32 can also be incorporated in the seat as shown in FIG. 1. Situated under the center seating position 24c is a pretensioning device 200. The device 200 includes a bar 202 rotationally supported by bearings 204a and 204b. A first spool 206a is secured to end 208a of the bar. A second spool 206b is secured to end 208b of bar 202. The connecting members 60, such as a length of seat belt webbing or cable) is wound about a respective spool 206a and 206b. The other end of each connecting member 60 is connected to a buckle 50 or to the combination of buckles 50 and 50a. Fixedly secured to the bar 202 is a lever 210. In the embodiment shown in FIG. 10 the lever 210 is in the center of the bar 202, however, it can be located at any conventional location. A tensioning device 220 is operatively secured to the lever 210. The tensioning device 220 comprises a tubular housing 230 with a quantity of pyrotechnic material 232 located therein. A piston 240 is situated upstream of the material 232. A push rod 242 is connected to the piston and extends from the housing 230. Upon activation of the pyrotechnic material, products of combustion force the piston down the tube urging the push rod to move the lever 210 in the direction of arrow 242 thereby rotating the spools 204a and 204b and pulling the connecting members 60 downwardly to tighten the seat belts about the occupants. The piston and tube may include a known locking mechanism including a tapered groove and a number of balls in the groove. This locking mechanism acts as a one-way clutch permitting movement of the piston in the direction of arrow 240 but not in an opposite direction. A slight movement in this opposite direction causes the balls to ride up the ramped groove and bite into the inside wall of the tube, preventing further motion in the opposite direction. The pushing type of device can be replaced by the pretensioner 160 and cable 152 which when activated will pull the lever to its activated position. Energy absorption can be achieved by using a torsion bar seat belt retractor 32 of known construction.

Figure 11:
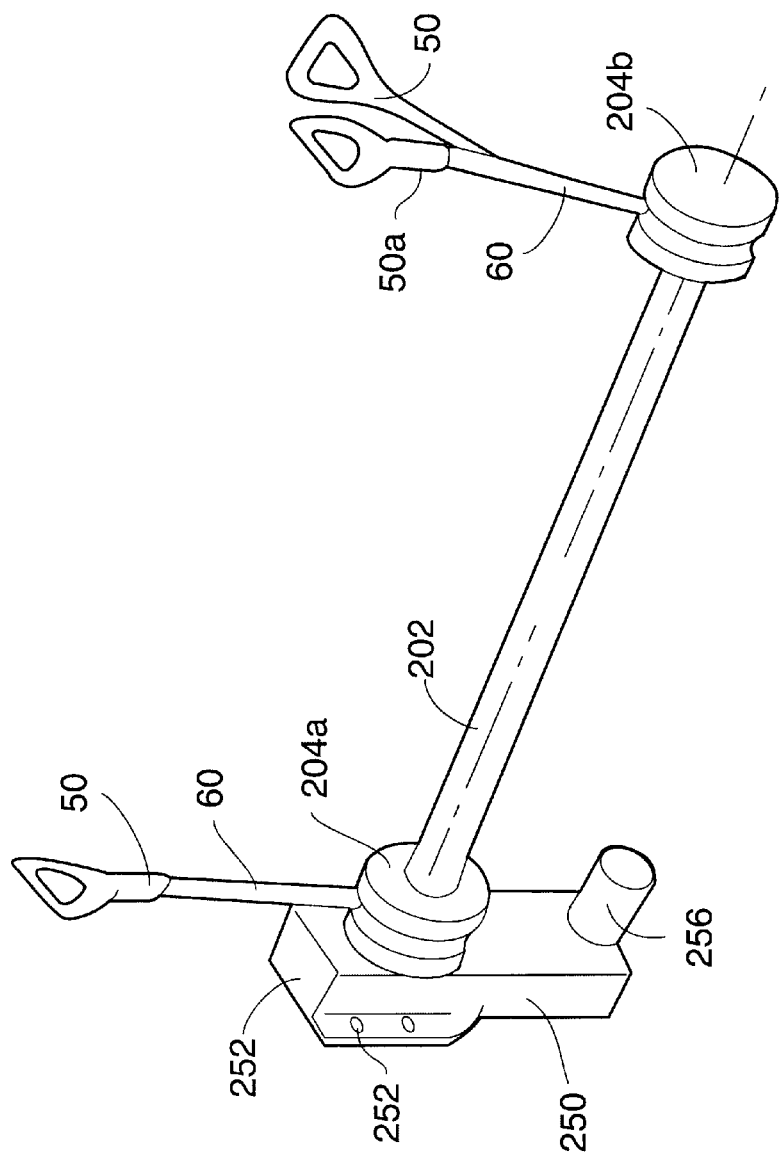
FIG. 11 shows an added embodiment of the invention.

FIG. 11 shows another embodiment of the invention. The lever and/or cable activated devices of FIGS. 9 and 10 have been removed and replaced with a direct drive pretensioning device 250. In this embodiment the device 250 includes a housing 252 secured via bolts (not shown) that are received through opens 254 to a support member. Situated within the housing is a movable toothed rack that is linearly movable in the housing. One end of the rack is located adjacent a quantity of pyrotechnic material 256. The rack includes driving teeth. The end of the bar 202 that is received within the housing 252 is fitted with a tooth spur gear (or other gear) and is supported for rotation in the housing. The rack is initially maintained out of engagement with the spur gear. On activation of the pyrotechnic material, the rack engages the spur gear and rotates the gear. This rotation also rotates the bar 202, attached to the spur gear, to wind the connecting members 60 on the respective spool and tighten the seat belt about the occupant(s).

Many changes and modifications in the above-described embodiment of the invention can, of course, be carried out without departing from the scope thereof. Accordingly, that scope is intended to be limited only by the scope of the appended claims.

We claim:

1. A system for eliminating residual seat belt slack about a plurality of occupants of a vehicle, the system comprising:
    a plurality of seat belt assemblies securable about a respective occupant, each seat belt assembly including a lap belt portion, a tongue, and a buckle, one end of the lap belt secured to a support member and an opposite end of the lap belt operatively joined to the tongue, the buckle matingly locking with the tongue, the buckle secured to one end of a connecting member, the connecting member having an opposite second end;
    belt tightening means, secured to the second end of each connecting member, for generally simultaneously tightening each seat belt assembly about a respective occupant.

2. The device as defined in claim 1 wherein the belt tightening means includes
    a spool (86) rotatably mounted on a frame, the spool including a slot therethrough;
    a flexible pulling member (90, 90a, 90b) extending through the spool, the flexible pulling member including a first end secured to a second end of the connecting member of a first of the buckles and a second end connected to the second end of the connecting members of the other buckles;
    winding means operatively linked to the spool for winding the spool in a manner to wind the flexible pulling members therein to thereby remove the slack in each seat belt assembly.

3. The device as defined in claim 2 wherein the flexible pulling member includes a single length of flexible material, which is slidingly received through the slot of the spool.

4. The device as defined in claim 3 wherein the single length of flexible material is a length of seat belt material.

5. The device as defined in claim 3 further including guide loop means (124) one each associated with an end of the pulling member for redirecting the direction at which the pulling member pulls on each connecting member.

6. The device as defined in claim 1 wherein the belt tightening means includes
    a spool (86) rotatably mounted on a frame, the spool including two openings (143) therein;
    two flexible pulling members (130a, 130b) each having a first end, the first end of each pulling member lockingly received within a respective one of the openings, each pulling member including a second end, a first end of one of the pulling members secured to a second end of the connecting member of a first of the buckles and the second end of the other pulling member connected to the second end of the connecting members of the other buckles;

winding means operatively linked to the spool for winding the spool in a manner to wind the flexible pulling members therein to thereby remove the slack in each seat belt assembly.

7. The device as defined in claim 6 further including guide means (140) one each associated with each pulling member for redirecting the direction at which the pulling member pulls on each connecting member.

8. The device as defined in claim 6 wherein the pulling members are formed by a length of cable.

9. The belt tightening means as defined in claim 1 including:

a plurality of flexible pulling members connected to second ends of respective connecting members, the plurality of pulling members joined together at a common connecting location, pretension means, connected to the common connecting location for pulling the connecting location linearly thereby pulling on the connecting members to pull each buckle to remove slack associated with each seat belt assembly.

* * * * *